United States Patent [19]

Spiker

[11] Patent Number: 5,586,220

[45] Date of Patent: Dec. 17, 1996

[54] SAFE SYSTEM PROVIDED WITH NEURAL CIRCUIT

[75] Inventor: Rolf T. E. Spiker, Bennekom, Netherlands

[73] Assignee: GTI Industrial Automation B.V., Apeldoorn, Netherlands

[21] Appl. No.: 204,297

[22] PCT Filed: Sep. 9, 1992

[86] PCT No.: PCT/NL92/00155

§ 371 Date: May 18, 1994

§ 102(e) Date: May 18, 1994

[87] PCT Pub. No.: WO93/05453

PCT Pub. Date: Mar. 18, 1993

[30] Foreign Application Priority Data

Sep. 9, 1991 [NL] Netherlands .......................... 91.01518

[51] Int. Cl.[6] .............................. G06E 1/00; G06E 3/00; G06F 15/18
[52] U.S. Cl. ................................. 395/22; 395/21; 395/24
[58] Field of Search ........................... 123/159; 376/215; 395/20–25, 27; 382/155–159

[56] References Cited

U.S. PATENT DOCUMENTS 4,515,125  5/1985  Buck et al. ............................. 123/359
4,880,596  11/1989  Barrus et al. .
5,311,562  5/1994  Palusamy et al. ...................... 376/215

FOREIGN PATENT DOCUMENTS 2150373  10/1983  United Kingdom ............. H02H 3/00

OTHER PUBLICATIONS

Proceedings Tencon 87: 1987 IEEE Region 10 Conference vol. 3, 25 Aug. 1987, Seoul, Korea.
Twenty–Second Asilomar Conference on Signals, Systems & Computers, vol. 1, 31 Oct. 1988, Pacific Grove, U.S.A.
INNC 90: International Neural Network Conference vol. 1, 9 Jul. 1990, Paris, France.

*Primary Examiner*—Robert W. Downs
*Assistant Examiner*—Tariq R. Hafiz
*Attorney, Agent, or Firm*—Webb Ziesenheim Bruening Logsdon Orkin & Hanson, P.C.

[57] ABSTRACT

Disclosed is an electronic control circuit of the fail-safe emergency shut-down type which includes an input circuit, a first signal processing circuit, in which information is stored beforehand relating to extreme values input signals are permitted to reach, and an output circuit. The first signal processing circuit includes at least one neural network configured from very large numbers of neurons operating as integrators and in real-time which operate in parallel and which are mutually connected on a large scale. The networks are implemented in hardware and the extreme values are distributed over the neurons. When one of the extreme values is exceeded, the output circuit generates a shut-off signal and a component controlled thereby is placed in a safe state.

7 Claims, 5 Drawing Sheets

SAFE SYSTEM PROVIDED WITH NEURAL CIRCUIT

FIELD OF THE INVENTION

The invention relates to an electronic control circuit of the "Fail-Safe Emergency Shut-Down" type comprising an input circuit, a first signal processing circuit, in which information is stored beforehand relating to the extreme values input signals are permitted to reach, and an output circuit.

DESCRIPTION OF THE PRIOR ART

The expression "Fail-Safe" in the context of Emergency Shut-Down systems means in practice that the probability of a system defect as a result of which a non-defined final state occurs is as small as possible. The order of magnitude of this hazard P is equal to $10^{-6}$ or smaller. A system defect can occur due to all possible kinds of defects in components or combinations thereof.

A "Safety Related System" (SRS) of this type is used to determine any possible danger exceeding of one or more predetermined safety limits in a process outside the area that is controlled and regulated by the Process Control System and, after detection of this exceeding, to automatically return this process to a wholly safe state without an operator having to intervene and without an operator having to be informed of the cause.

The greatest possible reliability in combination with simplicity is obtained with a control circuit of the described type which has the feature that the said first signal processing circuit comprises at least one neural network configured from very large numbers of neurons operating as integrators and in real-time which operate in parallel and are mutually connected on a large scale, which networks are implemented in hardware and wherein the said extreme values are distributed over the neurons, wherein in the case when one of the said extreme values is exceeded the output circuit generates a shut-off signal whereby a component controlled thereby is placed in a safe state.

In a further embodiment the control circuit according to the invention is characterized by a second signal processing circuit comprising at least one neural network that is configured from very large numbers of neurons operating as integrators and in real-time which operate in parallel and are mutually connected on a large scale, which networks are implemented in hardware, in which second signal processing circuit information is stored relating to extreme values of the changes in the time that the output signals are permitted to have, wherein in the case when one of the said extreme values is exceeded the output circuit generates an alarm signal which can control an alarm signalling device.

This latter circuit is capable of detecting any potentially dangerous trend. After detection of a potential danger an alarm signal is transmitted to a monitoring station. On the basis of this alarm signal an operator can intervene in the system. If this intervention does not take place, the first signal processing circuit will, if the trend continues, detect after a period of time that one or more of the predetermined limits has been exceeded, whereby automatic shut-off of the process takes place without the intervention of an operator.

It is noted that a fail-safe disconnectable power supply is known from GB-A-2 150 374. The fail-safe principle is implemented by means of a transistor switch in combination with a fuse connected thereto in series and two relay contacts connected in parallel which can blow the fuse when the transistor circuit fails. This principle is known as the de-energize to blow principle.

A second fuse is further connected in series to the power supply circuit of the two parallel relays. This fuse is blown at each fail-safe shut-down command to prevent automatic restart and has to be replaced each time after a shut-down.

If regular testing of the two parallel relays is not possible, an inverter is then used to generate the fail-safe power.

Known from the Proceedings Tencon 87: 1987 IEE Region 10 Conference, part 3, Aug. 25, 1987, pages 893–898 "Intelligent control of variably configures systems using neural networks" is a rapid associative memory technique which is used for efficient classification of a large number of complex stored control patterns. Instead of a conventional expert system with chaining techniques, which operates too slowly, use is made of a specific database technique in combination with a memory making use of neural networks. This document does not therefore relate to an electronic control circuit of the type according to the invention.

SUMMARY OF THE INVENTION

The circuits according to the invention can be employed in all Emergency Shut-Down applications in SRS such as described in the Draft IEC document 65A.9.1 (functional safety of electrical/electronic/programmable electronic systems, part 1: general requirements) and in the Draft ISA document SP 84 (Programmable Electronic Systems (PES) for use in Safety Applications). The circuits are further suitable for instance for "blow-off" applications such as in natural gas extraction and processing.

The safety function which is related to the operation of the first signal processing circuit consists of the complete shut-off of the process, for instance a petrochemical process, when one or more process limits is exceeded. Exceeding of such a limit is designated "Process Demand".

The first signal processing circuit acts "passively", that is, the ESD system monitors the process passively and, when a set limit value is exceeded, unconditionally initiates a shut-down action. This shut-down action is carried out to completion. Differentiation does not occur. The passive character is based on the monitoring of a possible exceeding of a process parameter. As long as no exceeding occurs, no action will be taken and when exceeding does occur a complete shut-down action is performed.

In this circuit the shut-down part is based on the "de-energize to trip" principle. This means that in the case of defects in system components the ESD system switches itself to the logic zero state and the coupled fail-safe output amplifiers can no longer generate any electrical energy. These amplifiers are electrically connected to the electrical "final elements" (process actuators such as valves and magnet switches). Closing of these valves causes a Process-Shut-Down, which is defined as a safe state. The electronic control circuit with the said first signal processing circuit can function as an independent unit.

The safety functions implemented in the second signal processing circuit consist of permanent evaluation of both analog and digital process input signals and deriving therefrom of the process behaviour. On the basis of this behaviour the trend of the process can be determined. When the normal operational "safety trend" trends toward an "unsafe trend" this means that if this "unsafe trend" continues the process reaches the defined "shut-down" limit after a determined time depending on the rapidity of change. At the moment of detection of the "unsafe trend" the second signal processing circuit, the "smart" part, generates the above mentioned alarm signal whereby an operator can be warned. The warning can also be transmitted to the process control system. Actions by the operator or the Control System must ensure that the "unsafe trend" is adjusted to the "safety trend", that is, the normal safe operation situation. If this corrective command is not performed by an adjustment of the "unsafe trend" to a "safety trend", an unconditional "shut-down" action is then initiated by the first signal processing circuit within a given safe period. The second signal processing circuit can therefore also be considered an add-on function of the first signal processing circuit.

The first signal processing circuit and the second signal processing circuit operate wholly independently of each other and cannot influence each other in any way.

The "smart" behaviour of the total ESD safety system is based on the fact that the control system and/or the operator is given the opportunity to intervene at the earliest possible stage before the limit for a safety shut-down action is reached. If the control system and/or the operator are not capable of correcting the process trend a process shut-down is then carried out automatically when a process limit is exceeded which is detected by the first signal processing circuit. Unnecessary and costly shut-downs can hereby be avoided as well as potentially unsafe start-ups.

The "unsafe trend" is derived from the continuous behaviour of all relevant analog and/or digital input signals fed to the input circuit. This behaviour can be evaluated by the second signal processing circuit against the dynamic process safety model in the second signal processing circuit. This entails a certain "safety pattern" recognition.

BRIEF DESCRIPTION OF THE DRAWING

The invention will now be elucidated with reference to the annexed drawings. Wherein.

DESCRIPTION OF THE PREFERRED EMBODIMENTS

Figure 1:
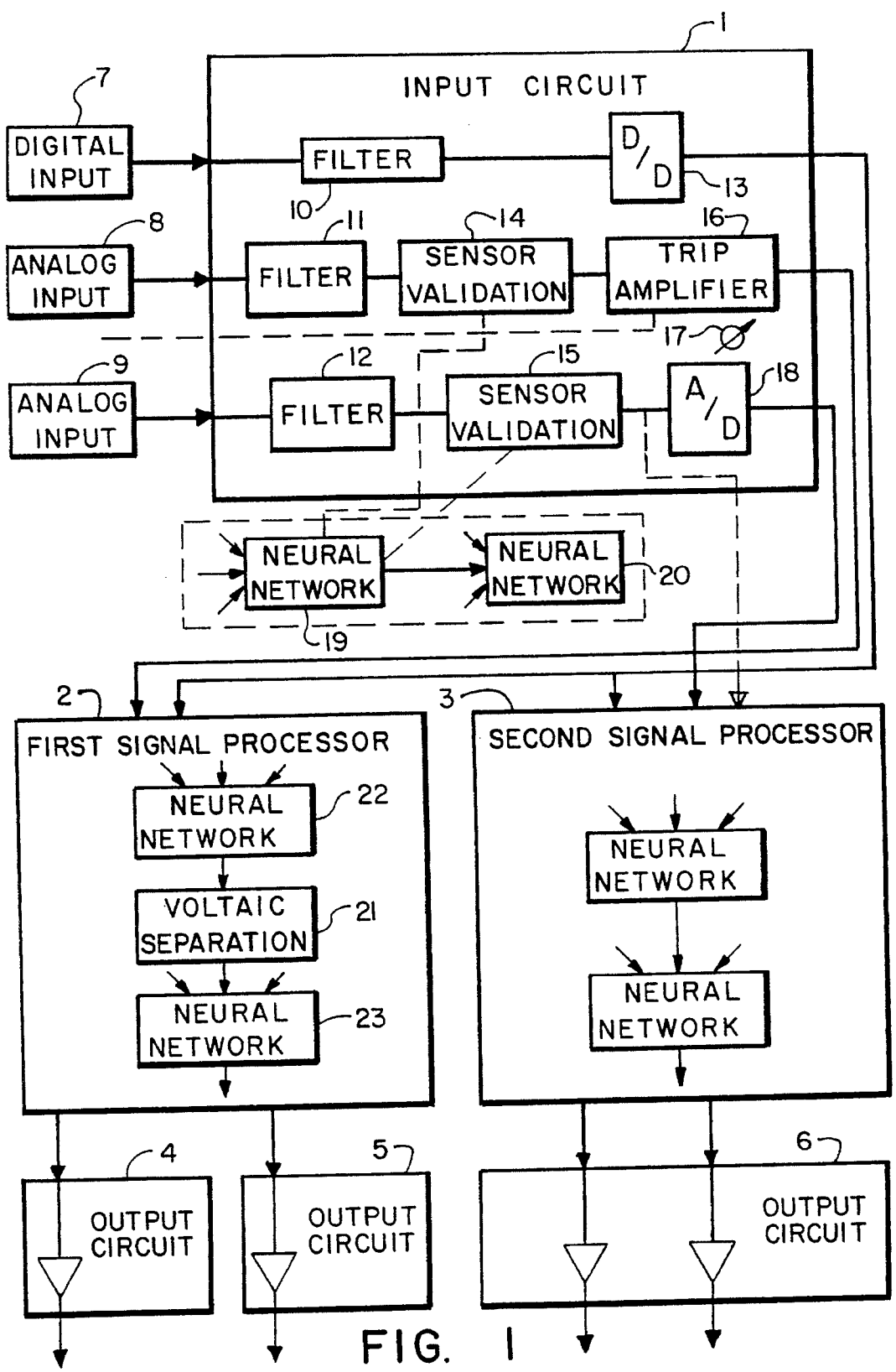
FIG. 1 shows a block diagram of a control circuit according to the invention.

FIG. 1 shows an Emergency Shut-Down system according to the invention. The safety circuit shown here comprises an input circuit 1, a first signal processing circuit 2, a second signal processing circuit 3 and output circuits 4, 5 and 6 respectively.

The input circuit comprises digital input signals 7 and analog input signals 8 and 9. The input signals are fed to respective filters 10, 11, 12. The output of the filter 10 is connected to a D/D converter 13 which can subject the digital signals to a desired digital signal processing. The output of the converter 13 is connected to the inputs of the signal processing circuits 2 and 3.

The outputs of filters 11 and 12 are connected to the respective on-line dynamic sensor validation units, 14, 15. The output of the unit 14 is connected to a trip-amplifier 16 with adjustable threshold value. The adjusting unit is designated with 17. The output of the trip-amplifier 16 is connected to an input of the first signal processing circuit 2.

The output of the unit 15 is connected to an A/D converter 18. The output of the A/D converter 18 is connected to an input of the second signal processing circuit 3. If required the signal processing circuit 3 can also be implemented in analog manner, in which case the output of unit 15 is directly connected to the circuit 3. This is indicated with a broken connecting line.

The on-line dynamic sensor validation units 14, 15 comprise neural networks. These are shown schematically and designated with the reference numerals 19, 20.

The output circuit 4 is of the fail-safe type, gives a binary output signal and serves to control final elements, such as valves and the like, of the process. The output circuit 5 can generate binary and digital signals and serve to control signal lamps, alarm lamps, status indicators and event indicators. The output circuit 6 can generate binary and digital signals and in the drawn embodiment has two outputs, the one for feeding an alarm signal to an operator panel for warning and initiating the cause of the warning and the other for feeding an alarm signal to a control system for corrective actions.

The input filters 10, 11, 12 are of the voltaically separated type. The trip amplifier 16 generates a binary "0" signal when the limit adjustable by means of 17 is passed. This is the de-energized to trip principle. Setting of the limit value can take place locally or by means of remote control. Analog input signals can if desired be mathematically processed prior to performing a trip function. The output signal of the trip amplifier 16 corresponds with a given process limit and is therefore fed only to the first signal processing circuit 2.

The units 14 and 15 examine on a continuous basis the quality of analog input signals which come from an analog process transmitter. Deviating behaviour (as a consequence of a rapidly or slowly occurring failure) in relation to the historic behaviour through permanent comparison with an individually configured historical database or deviating behaviour relative to the input signal of a redundant transmitter will generate an alarm signal.

It is generally noted that all auxiliary connections (that is, non-safety-critical connections) are embodied in fail-safe manner and voltaically separated in the ESD system so that these connections cannot disturb the safety level of the ESD system in any way.

The trip adjustment 17 can, as already noted, take place locally or via remote control but the maximum trip limit is fixed in "hardwired" form.

Figure 2:
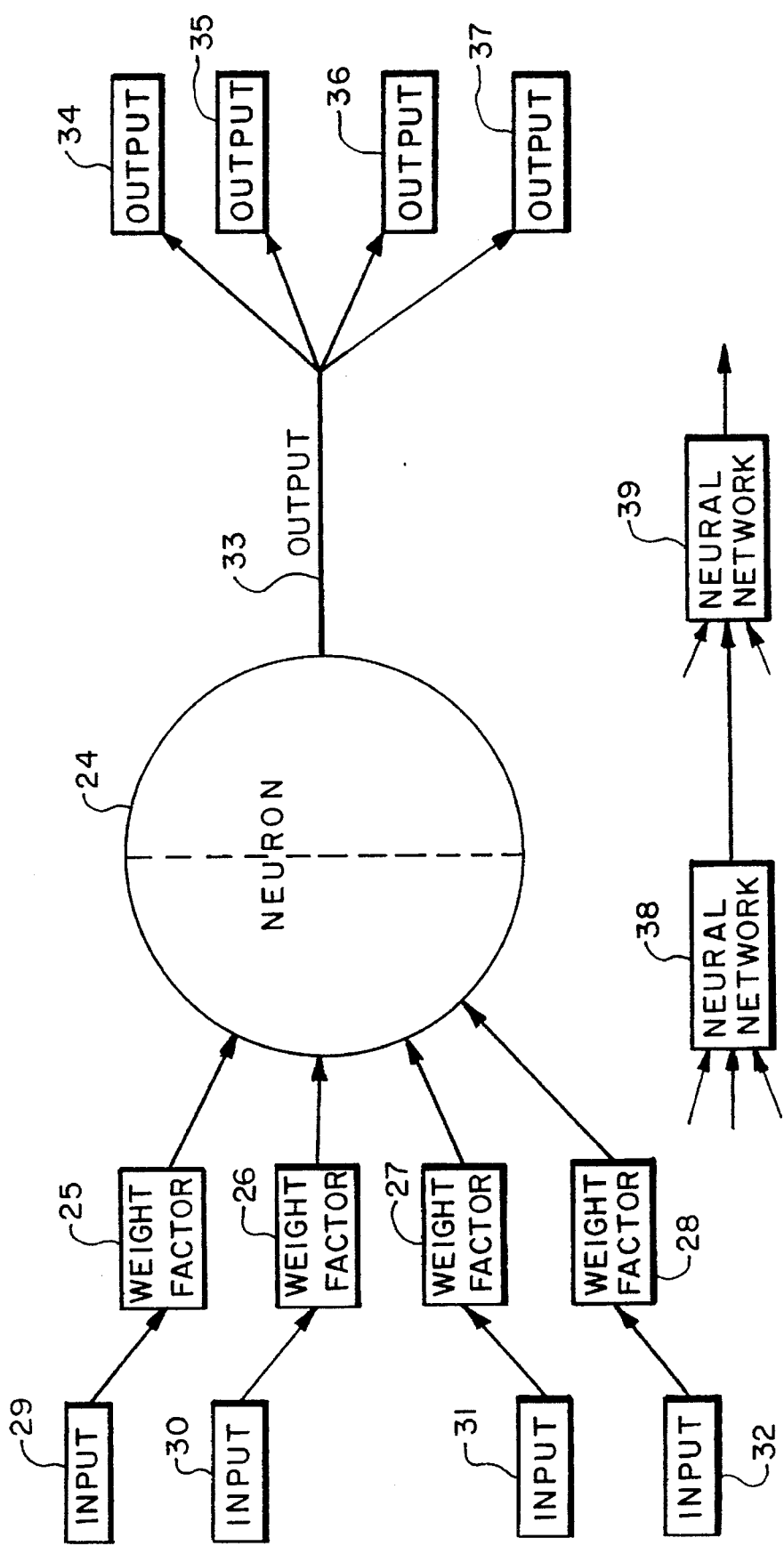
FIG. 2 shows a schematic view of the structure of a basic neuron.

The basic unit of a neural network is a processing element, also designated PE, cell or junction (see FIG. 2). Its function is analogous to that of a biological neuron. It combines (totalizes) the input signals and generates an output signal in accordance with a transfer function (typically a threshold function). A neural network comprises many processing elements which are combined in diverse layers. The output path of one processing element is connected to the input path of other processing elements. These connections are "weighted" by means of weighting factors. These latter form the memory elements of the network. Since each of the very many connections has a corresponding weighting factor the summation performed by each processing element can be treated as a weighted sum. To prevent common cause failures in the first signal processing circuit 2 as according to FIG. 1, use is made of a voltaic separation 21 between all neurons, two of which are shown and designated with 22, 23.

Neural networks derive their force from a mass parallelism of neurons, which requires large numbers of neurons, which are grouped in layers, in addition to a very large number of mutual connections between the neurons. A neuron itself functions in principle as an integrator and is not specifically intelligent. A very important characteristic of neural networks is their ability to learn. Other than in digital microprocessor systems, which are based on algorithms and wherein the knowledge exists explicitly in the form of rules (software), neural networks generate their own rules by learning from examples. The learning, the training process, takes place by means of an adaptive process. When an input signal is repeatedly imposed on the input of a neural network and a corresponding desired output signal is repeatedly imposed on the output, the neural network teaches itself and gradually adapts itself to the desired transfers. A further very important property of neural networks is the manner in which information is stored and processed. The memory of a neural network is both distributed and associative and the processing function is distributed. A unit of knowledge which is for instance represented by a certain input pattern relative to a desired output pattern is also distributed over all memory and processing units in the network and shares these units with all other knowledge units stored in the network. No specific neuron in the network plays an important role. All neurons overlap one another functionally a little less than hundred percent, for instance ninety-nine percent. This inherent distribution property and insensitivity to defects of individual neurons is extremely important for the Safety Integrity Level and the Availability Level of the ESD system in the signal processing circuit 2. The safety integrity level is defined as the chance of the system not being switched off when this should in fact happen. The availability level is defined as the chance of the system being switched off when this should not happen. The associative character of the neural memories means that if the network receives a partial input the network selects the closest fit from its memory and generates an output signal which corresponds with a complete input. Particularly this latter characteristic is important for the "unsafe trend" recognition in the second signal processing circuit 3 and the sensor validation units 14 and 15. The neuron 24 shown in FIG. 2 is connected via synaptic weighting factors 25, 26, 27, 28 to inputs 29, 30, 31, 32. A weighted sum is transferred to an axon or output 33 and is connected to parallel outputs 34, 35, 36, 37. Neurons 38, 39 are shown schematically. It is remarked that the greatly simplified diagram of FIG. 2 only relates to a simple example and that other numbers of inputs and outputs are also possible.

Figure 3:
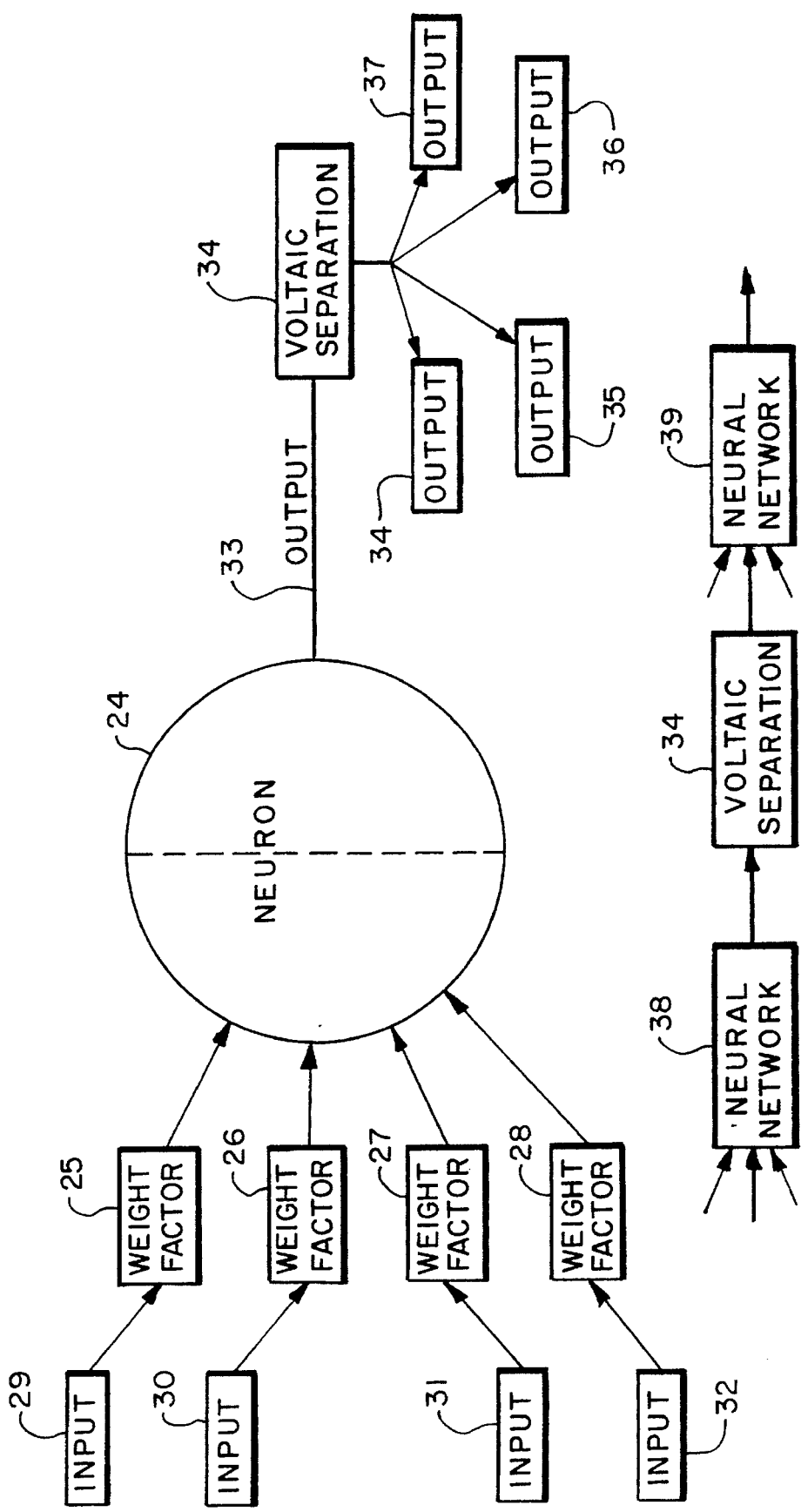
FIG. 3 is a diagram corresponding to FIG. 2 in which use is made of voltaic separations.

FIG. 3 shows a variant in which a voltaic separation 34 is incorporated in the axon 33. Common cause failures are hereby prevented. This voltaic separation 14 is also shown between the neurons 38, 39.

Figure 4:
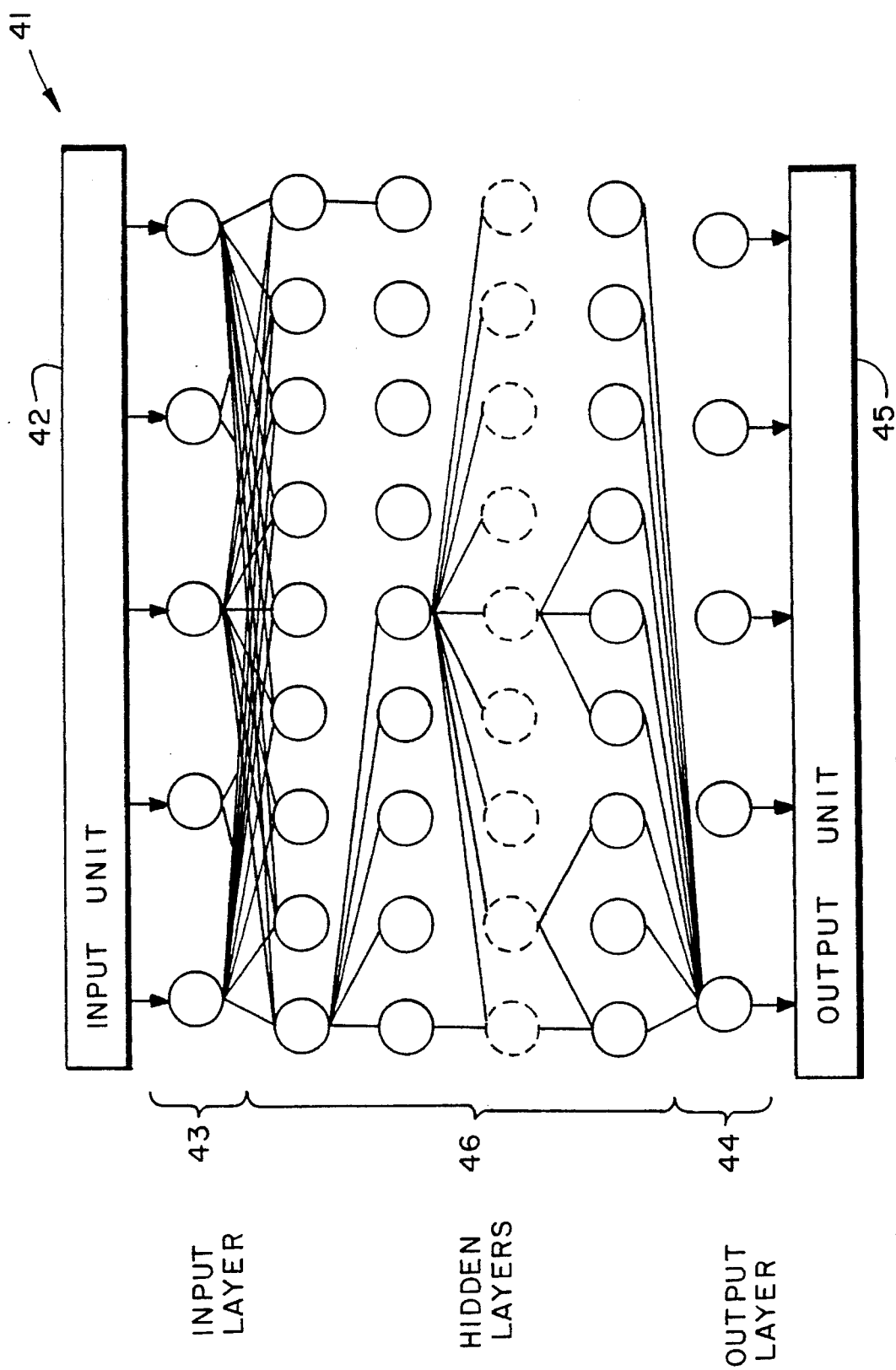
FIG. 4 is a highly schematized view of a typical neural network.

FIG. 4 shows a typical structure of a neural network in a greatly simplified schematic view. The network 41 comprises input information from an input unit 42 which feed information to an input layer 43. An output layer 44 carries output information to an output unit 45. Situated between the input layer 43 and the output layer 44 is a large number of "hidden" layers which are collectively designated with 46. The number of neurons per layer and the number of layers depend on the application.

The neural networks may be simulated network circuits as well as structured on the basis of Neural Bit Slice (NBS) techniques. This relates to semiconductor multiple digital (VLSI) slice devices designed for implementing real-time neural network systems and operating in parallel.

Figure 5:
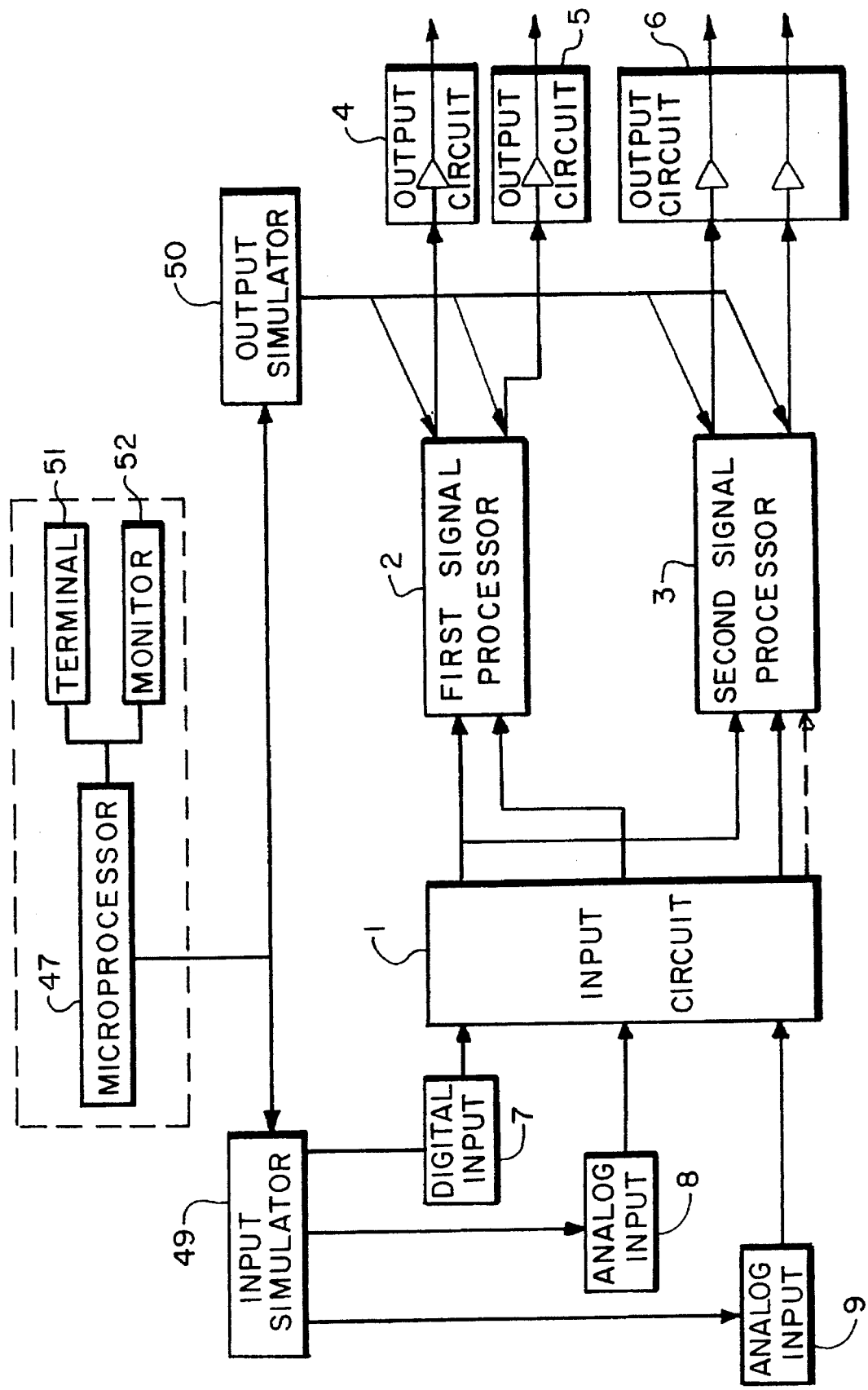
FIG. 5 is a block diagram corresponding to FIG. 1 and shows the way in which the circuit can learn.

FIG. 5 shows schematically the manner in which the circuit shown in FIG. 1 can be trained. Use is made of a microprocessor 47 which feeds input signals to the inputs 7, 8, 9 for the required time period and which, per set of input signals, imposes desired corresponding output signals on the outputs of the signal processing circuits 2, 3. Use is made for this purpose of an input simulator 49 and an output simulator 50 which are both jointly controlled by the microprocessor 47. A terminal 51 and a monitor 52 are added to the microprocessor 47. Use is made of a "Cause & Effect diagram". A cause and effect diagram comprises a complete set of input signals and a complete set of associated output signals. A Functional Logic Diagram is obtained through a whole range of cause and effect diagrams.

The learning process of the on-line dynamic sensor validation units 14, 15 can take place in two ways: (a) by means of an autodidactic process for a preselected time period during normal plant operations; (b) by a pre-defined program which is provided using the computer system 47, 49, 50, 51, 52 to the inputs and the outputs of the system according to the invention.

System software and application software are not present in the ESD system.

It is noted that neural networks for this application can be distinguished by three, in principle different structures, namely: feed-forward, feed-back and lateral feed-back. Other structures or combinations of the said basic structures are also possible.

I claim:

1. An electronic fail-safe emergency shut-down control circuit comprising an input circuit, a first signal processing circuit in which information is stored beforehand relating to extreme values which input signals are permitted to reach, and an output circuit which generates a shut-off signal when one of said extreme values in said first signal processing circuit is exceeded, whereby a component controlled by said control circuit is placed in a safe state, wherein the first signal processing circuit includes at least one neural network configured from very large numbers of mutually connected neurons operating in real-time on a large scale in parallel as integrators, with said at least one neural network in said first signal processing circuit implemented in hardware and wherein said extreme values are distributed over the neurons, said neurons being voltaically separated from each other to prevent common cause failure;

further including a second signal processing circuit in which information is stored relating to extreme values of permitted changes in the time of the output signals, wherein when one of said extreme values in said second signal processing circuit is exceeded the output circuit generates an alarm signal which can control an alarm signalling device;

wherein the second signal processing circuit includes at least one neural network configures from very large numbers of mutually connected neurons operating in real-time in parallel as integrators, with said at least one neural network in said second signal processing circuit implemented in hardware and wherein said extreme values are distributed over the neurons; and wherein the input circuit includes a digital signal input filter, the output of which is connected to a digital-to-digital converter, the output of the digital-to-digital converter being connected to the first signal processing circuit and to the second signal processing circuit, and a first analog signal input filter, the output of which is connected to a first on-line dynamic sensor validation unit, the output of the first validation unit being connected to a trip-amplifier, and the output of the trip-amplifier being connected to a first signal processing unit.

2. The electronic control circuit as claimed in claim 1, wherein at least one of the digital signal input filters and the first analog signal input filter are of the voltaically separated type.

3. The electronic control circuit as claimed in claim 1, wherein the input circuit includes a second analog input filter, the output of which is connected to a second on-line dynamic sensor validation unit, the output of the second validation unit being connected to an analog-to-digital converter, and the output of the analog-to-digital converter being connected to the second signal processing unit.

4. The electronic control circuit as claimed in claim 3, wherein the second analog filter is of the voltaically separated type.

5. The electronic control circuit as claimed in claim 3, wherein the second sensor validation unit is a neural network.

6. The electronic control circuit as claimed in claim 1, wherein the first sensor validation unit is a neural network.

7. The electronic control circuit as claimed in claim 1, wherein the trip-amplifier has an adjustable threshold value.

\* \* \* \* \*

UNITED STATES PATENT AND TRADEMARK OFFICE
CERTIFICATE OF CORRECTION

PATENT NO. : 5,586,220
DATED : December 17, 1996
INVENTOR(S) : Rolf T. E. Spiker It is certified that error appears in the above-indentified patent and that said Letters Patent is hereby corrected as shown below:

Column 1 Line 65 "374" should read --373--.

Column 2 Line 12 "configures" should read --configured--.

Column 2 Line 65 ""safety trend" trends" should read --"safety trend" tends--.

Column 3 Line 8 "operation" should read --operating--.

Column 3 Line 36 "DRAWING" should read --DRAWINGS--.

Claim 1 Line 59 Column 6 "configures" should read --configured--.

Claim 1 Line 7 Column 7 "a first" should read --the first--.

Signed and Sealed this

Eighteenth Day of March, 1997

Attest:

BRUCE LEHMAN

*Attesting Officer*  Commissioner of Patents and Trademarks